United States Patent [19]

Meyers

[11] 3,926,092
[45] Dec. 16, 1975

[54] CONCENTRIC HYDRAULIC BRAKE BOOST MECHANISM WITH SYSTEM BY-PASS ON PISTON O.D.

[75] Inventor: Robert E. Meyers, South Bend, Ind.

[73] Assignee: The Bendix Corporation, South Bend, Ind.

[22] Filed: June 13, 1973

[21] Appl. No.: 369,625

[52] U.S. Cl. .................. 91/378; 60/548; 91/392; 91/450
[51] Int. Cl.² .................. F15B 9/10; F15B 13/04
[58] Field of Search .......... 91/376, 392, 404, 409, 91/416, 417, 431, 450, 449, 378; 60/548, 552

[56] References Cited
UNITED STATES PATENTS

| | | | |
|---|---|---|---|
| 1,312,649 | 8/1919 | Turner | 92/129 |
| 2,007,423 | 7/1935 | Davis | 91/449 X |
| 2,410,269 | 10/1946 | Chouings | 91/376 X |
| 2,763,989 | 9/1956 | Ayers, Jr. | 92/84 X |
| 2,811,148 | 10/1957 | Bobrowsky | 92/84 X |
| 3,450,005 | 6/1969 | Ellis | 60/548 X |
| 3,490,231 | 1/1970 | Klein | 60/548 |
| 3,602,347 | 8/1971 | Yamaguchi et al. | 91/404 X |
| 3,633,462 | 1/1972 | Goscenski | 91/450 |
| 3,677,007 | 7/1972 | Goscenski | 60/552 X |

*Primary Examiner*—Irwin C. Cohen
*Attorney, Agent, or Firm*—Ken C. Decker; William N. Antonis

[57] ABSTRACT

A hydraulic brake booster is connected in series flow relationship in a vehicle hydraulic system between a source of fluid pressure and other hydraulic power equipment, such as a steering gear. The booster includes a housing with a bore in communication with an inlet connected to the source and an outlet connected to the steering gear. A piston having an end exposed to a boost chamber is shiftable in the bore from a first position to a second position by control valve means slidably carried in a central passage of the piston for controlling communication between the inlet and boost chamber. A hydraulic fluid system by-pass valve separate from the control valve means, is located in the housing bore between the inlet and outlet for regulating inlet pressure and maintaining uninterrupted flow to the outlet upon shifting the piston.

8 Claims, 1 Drawing Figure

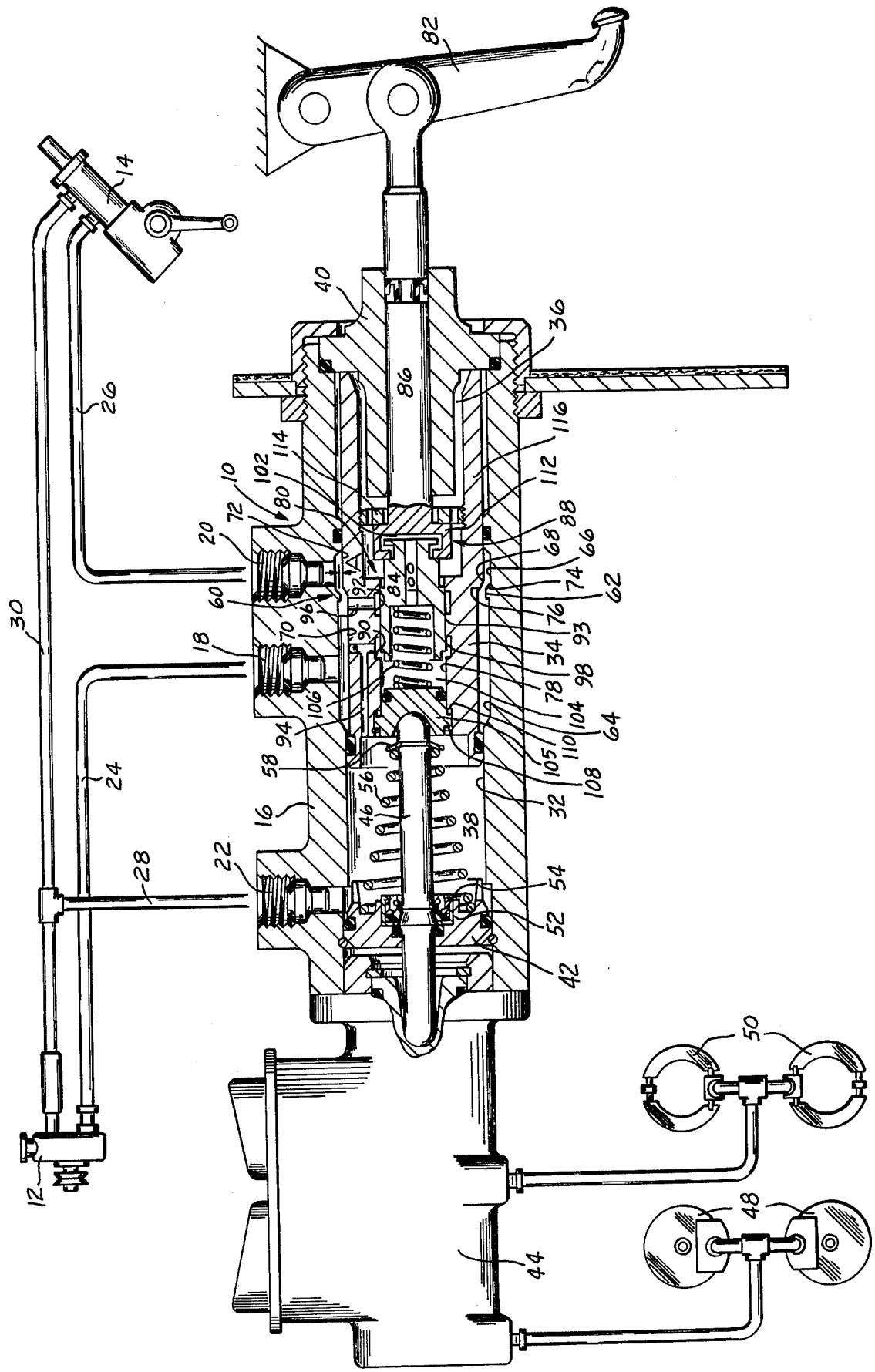

CONCENTRIC HYDRAULIC BRAKE BOOST MECHANISM WITH SYSTEM BY-PASS ON PISTON O.D.

BACKGROUND OF THE INVENTION

The invention relates to a hydraulic boost mechanism for use in the brake system of an automotive vehicle and more particularly to a boost mechanism of the concentric type which is connected in series flow relationship between a source of fluid and a steering gear or other equipment.

It has become common practice of recent years to combine a vehicle power brake boost mechanism with a hydraulic power steering gear system, the latter of which is supplied with fluid under pressure from a single source to be shared between the boost mechanism and steering gear as required. This sharing of hydraulic fluid or pressure between the boost mechansim and steering gear must be such that the function and performance of one shall not impair the operation and capability of the other or render it ineffective. As illustrated in U.S. Pat. No. 3,119,235, assigned to the common assignee, sharing of fluid pressure may be achieved through the use of a single control valve which divides the fluid pressure requirements between a brake boost mechanism and a power steering gear. Also, as shown in the hydraulic boost pressure device of U.S. Pat. No. 3,532,027, assigned to the common assignee, sharing of fluid between the boost mechanism and the steering gear may be accomplished with a control valve having a pilot relief valve therein which limits its pressure to a predetermined level slightly below maximum system pressure in order to preclude completely cutting off flow to the steering gear. It will be observed that the control valves per se of the prior art include all of the annular grooves and channels which regulate fluid flow to the brake booster as well as the flow to the steering gear. The invention separates the hydraulic system by-pass valve means from the booster control valve means. The system by-pass means, which regulates the sharing of fluid, is now associated with the power piston of the booster so that the overall axial length of the booster may be shortened.

SUMMARY OF THE INVENTION

Therefore, in view of the foregoing, it is an object of the invention to provide a concentric type brake boost mechanism connected in series flow relationship between a fluid source and a steering gear in which fluid by-pass means for the gear is separate from the control valve means.

Another object of this invention is to provide a concentric type brake boost mechanism connected in series fluid communication between a source of fluid and a steering gear in which fluid by-pass means for maintaining uninterrupted flow to the steering gear is responsive to piston position.

A further object of the invention is to provide a concentric type brake boost mechanism the overall length of which is reduced.

A still further object of the invention is to provide a concentric brake boost mechanism including a by-pass valve for regulating inlet pressure in which initial activation causes limited axial movement of the piston with respect to the force transmitting rod before driving engagement therebetween to facilitate shifting the piston from a first position at a lower inlet pressure to a second position establishing a higher inlet pressure.

DESCRIPTION OF THE DRAWINGS

The sole FIGURE of the drawing is a schematic view of a vehicle hydraulic system in which the hydraulic boost mechanism of my invention is illustrated in longitudinal cross section.

DETAILED DESCRIPTION

Referring now to the drawing reference numeral 10 designates a concentric hydraulic fluid boost mechanism connected in a vehicle hydraulic system in series flow relationship between a source of fluid under pressure such as a pump 12, and a steering gear valve 14 of the open center type operatively connected to the vehicle wheels, not shown, in a manner well known to those skilled in the art. The boost mechanism or brake booster 10 includes a housing 16 provided with an inlet port 18, an outlet port 20 and an exhaust port 22. The inlet port 18 is communicated to the high pressure side of the pump 12 through line 24. The outlet port 20 communicates with the inlet side of the steering gear 14 via conduit 26. A pipe line 28 connects the exhaust port 22 to a return line 30, the latter of which connects the steering gear 14 to the inlet or reservoir side of the pump 12.

The brake booster housing 16 is formed with a bore 32 which receives a power piston 34, shiftable in the bore from a first position to a second position. The piston 34 divides the housing into a boost chamber 36 and an exhaust chamber 38. An end fitting 40 sealingly closes one end of the housing bore 32 to form the pressure or boost chamber 36 into which one end of the piston projects. A fitting 42 also sealingly closes the other end of the housing bore 32 to form the exhaust chamber 38 into which the other end of the piston projects. The piston 34 is drivably connected to a split system master cylinder 44 through a coaxial extending force transmitting rod 46 for applying front brakes 48 and rear brakes 50. The fitting 42 is provided with an opening 52 for receiving a seal 54 through which the rod 46 slidingly extends. A spring 56 urges the rod 46 to its unapplied position, shown in the drawing. The spring 56 has one end in abutment with a spring retainer 58 secured to the rod 46 and the other end in engagement with the fitting 42. This locates one end of the rod within the bore 32 so that it is connected to the power piston when the latter is in its first position in the bore, as shown.

Hydraulic fluid by-pass means 60, responsive to the position of the piston in the bore, regulates fluid inlet pressure between predetermined lower and upper values or limits and maintains uninterrupted flow to the outlet. The by-pass means 60 includes an annular shoulder 62 formed in the bore 32 between the inlet 18 and the outlet 20 and at the junction of annular grooves 64 and 66. The by-pass means further includes a circumferential shoulder 68, which is located on the outer circumference of the piston 34 at the junction of the stepped diameters 70 and 72 adjacent to the annular shoulder 62 and spaced axially therefrom when the piston is in its first position to provide for the passage of fluid. The shoulders 62 and 68 are formed with sloping sides 74 and 76 respectively, having opposed facing relationship to provide a fixed gap of such a dimension as required to establish the necessary pressure drop therethrough to create the predeterined lower limit of inlet pressure when the piston is in its first position, as shown. The stepped diameter 72, which forms the outer portion of circumferential shoulder 68, is less than the inside diameter of the annular shoulder 62 to provide a gap or space A between the diameters which permits the circumferential shoulder 68 to pass through the annular shoulder when the piston is moved to its second position to create the predetermined upper limit inlet pressure. The gap or space A established between these shoulders 62 and 68 when the piston has been moved to the left, as viewed in the FIGURE, is predetermined by the pressure and flow requirements of the brake booster and the steering gear.

A central passage 78 within the piston 34 communicates with the boost chamber 36. Control valve means 80 is coaxially positioned in the central passage 78 for controlling communication between the chambers 36 and 38 to shift the piston as desired through manipulation of a foot pedal 82, which is operatively connected to a slidable spool valve 84, of the control valve means 80, through a driving linkage which includes a thrust plunger 86 and a T-slot connection 88. The central passage 78 is formed with internal annular recesses 90 and 92, defining an intermediate land 93 therebetween. A passageway 94 in the piston connects the recess 90 to the exhaust chamber 38 and a radial passage 96, also in piston, connects the recess 92 to annular groove 64, the latter of which is in continuous communication with the inlet 18. The spool valve 84 is formed with a land 98, which is in sliding contact with the land 93. The land 98 is of a given axial length so as to control the flow of fluid through the annular recesses 90 and 92 respectively, i.e. to the exhaust chamber 38 and the boost chamber 36 depending upon the position of the spool valve 84. A stepped longitudinal passage 100, extending axially through the spool valve 84, communicates a diametral channel 102 in the T-slot connection 88 with a cavity 104, which is located in the inner central passage 78 on the left end of the spool valve, as viewed in the FIGURE. The diametral channel 102 is in communication with the boost chamber 36. A return spring 106, located in the central cavity 104 of the central passage, is preloaded between the spool valve 84 and an end section or seat member 105 of the piston 34. The seat member 105, which closes one end of the central passage 78, is slidably carried therein for limited axial movement between a stop or retainer ring 108 secured in the passage and an annular abutment 110 formed therein. The spring 106 urges the spool valve 84 to its released position, in which a flange 112 of the T-slot connection 88 abuts a ring 114, which is threadedly secured to an apron 116 of the piston 34. The seat member 105 is moved axially under the influence of the net force between the piston spring 56 and the return spring 106. In the released position of the boost mechanism illustrated, the force of the return spring 106 is greater, urging the seat 105 against the stop ring 108. It will be noted, however, that this net force is less than the force required to move the master cylinder piston to which the rod 46 is drivably connected. Connecting the sliding seat 105 between the force transmitting rod 96 and the piston 34, as above described, provides means for effecting limited axial movement of the piston with respect to the rod before establishing driving engagement between the rod and piston so that the piston is moved under the influence of the predetermined lower pressure to its second position where the predetermined higher inlet pressure is developed. The means for effecting limited axial movement between the piston and rod forestalls loading, the piston before the by-pass valve 60 has developed the higher inlet pressure needed to drive the rod 46 and master cylinder piston. Also, the sliding seat means 105 eliminates the necessity of strict tolerance controls in the manufacture of the boost mechanism to insure the correct driving relationship between the piston 34 and the rod 46.

MODE OF OPERATION

Assuming the pump 12 is running and the brake pedal 82 is released, the relationship of the component parts of the brake boost mechanism 10 will be as shown in the FIGURE. Hydraulic fluid now flows from the pump 12 to the inlet 18, through by-pass means 60, outlet 20, steering gear 14 and return line 30 back to the pump. The boost chamber 36 is communicated to the exhaust port 22 through the diametral channel 102, stepped longitudinal passage 100, annular recess 90, passage 94 and exhaust chamber 38. The inlet back pressure acting in the annular groove 64, radial passage 96 and annular recess 92 is now at some predetermined lower limit as determined by the system requirements concerning sharing of fluid between the brake booster and the steering gear. The land 98 laps or covers the annular recess 92, precluding communication with the boost chamber 36. Depressing the pedal 82 moves the spool valve 84 to the left, causing the land 98 to close the recess 90, cutting off communication with the boost chamber, and to open the recess 92, establishing communication with the boost chamber 36. This connects the boost chamber 36 to the inlet back pressure in annular groove 64, now of the predetermined lower value, which acts on the piston shifting it to the left from its first position toward its second position. Initially shifting of the piston toward its second position, closes the space between the seat 105 and the abutment 110. This action allows the piston to be shifted by the predetermined lower pressure before actually encountering any load resistance. Piston movement toward the second position narrows the gap between the shoulders 62 and 68 so that the resistance to fluid flow between the inlet and outlet becomes greater, increasing the inlet back pressure in the annular groove 64 above the predetermined lower value. Further spool valve movement to the left exposes the boost chamber 36 to this increased back pressure, causing further piston movment toward the second position so that the restriction to fluid flow through the area or gap A between the shoulders is further increased, thus developing the predetermined upper limit of inlet back pressure which is available at the operator's discretion if further braking is required.

I claim:

1. In a hydraulic boost mechanism for a vehicle hydraulic system including a fluid pressure source:
    a housing defining a bore therewithin having an inlet adapted to be connected to said source and an outlet;
    a piston slidably mounted in said bore and cooperating with one end of the latter to define a boost chamber therebetween;
    fluid pressure control means carried by said piston and by the wall of the bore for regulating the fluid pressure level at said inlet between a lower value when said piston is disposed in a first position and a higher value when the piston is shifted toward a second position, said fluid pressure control means including means for maintaining a continuous flow to the outlet independently of the position of the pistons said fluid pressure control means being defined by radially spaced annular surface means on said piston and said bore, respectively;

means defining a vent for said boost chamber;

control valve means slidably and coaxially arranged in said piston and shiftable from a first condition communicating said boost chamber to the means defining said vent and to a second condition closing communication through the means defining the vent and initiating communication between the inlet and the boost chamber as the control valve means is shifted from the first condition; and first resilient means acting on the control valve means to urge the latter to said first condition and second resilient means acting on said piston urging the latter to said first position.

2. A hydraulic boost mechanism, as recited in claim 1, in which the fluid pressure control means comprises:

an annular shoulder in the bore of the housing; and a circumferential shoulder on the piston adjacent the annular shoulder and axially spaced a given distance from the annular shoulder when the piston is in its first position to establish the predetermined lower value of inlet pressure;

said circumferential shoulder having an outside diameter less than the inside diameter of the annular shoulder to permit the circumferential shoulder to pass through the annular shoulder when the piston is in its second position to establish the predetermined upper value of inlet pressure.

3. A hydraulic boost mechanism, as recited in claim 2, in which the shoulders are formed with sloping sides in facing relationship one to the other.

4. A hydraulic boost mechanism, as recited in claim 1, further comprising:

a force transmitting rod coaxial of the piston and having one end connected to the piston and the other end adapted to be connected to a brake master cylinder; and means within the piston operatively connected between said one end of the rod and the piston for effecting limited axial movement of the piston with respect to the rod before establishing driving engagement therebetween so that the piston may be moved from the first position under the influence of the predetermined lower pressure to the second postion where the predetermined upper pressure is available for concurrently moving the rod and piston.

5. A hydraulic boost mechanism, as recited in claim 4, in which the means for effecting limited axial movement between the rod and piston comprises:

a seat member slidably carried by said piston opposite the control valve means;

said seat member being in driving engagement with the rod;

a retainer ring located within said piston against which the seat member is urged by the first resilient means when the piston is in its first position, and an abutment carried by said piston axially spaced from the seat member a predetermined distance for engagement with the seat member upon shifting the piston to its second position so that the piston is drivably connected to the seat member and to the rod.

6. A hydraulic boost mechanism, as recited in claim 5, in which the resilient means is a coil spring within the piston interposed between the control valves means and the seat member.

7. A hydraulic boost mechanism, as recited in claim 6, in which the control valve means includes a spool valve formed with a single land therein which controls communication between the boost chamber and a pair of axially spaced apart annular recesses carried by the piston and connected respectively to the inlet and to said vent means.

8. A hydraulic boost mechanism, as recited in claim 7, further including:

foot pedal actuated means having means including a T-slot connection for connecting the foot pedal actuated means to the spool valve;

said spool valve having a longitudinal passage therethrough;

said T-slot connection having a diametral channel therein which connects the boost chamber to one end of the longitudinal passage.

* * * * *